(12) United States Patent
Lai et al.

(10) Patent No.: US 7,590,569 B2
(45) Date of Patent: Sep. 15, 2009

(54) METHOD AND MEDIUM OF BILLING VIEWERS WHO DYNAMICALLY REORDER A LIST OF ADVERTISEMENTS

(76) Inventors: Lisa Karjiung Lai, 1328 Yan An Xi Road, #7, Room 1901, Shanghai (CN); Gu Ming, Long Shui Nan Road, Long Nan 5 Cun #53, Room 101, Shanghai (CN)

( * ) Notice: Subject to any disclaimer, the term of this patent is extended or adjusted under 35 U.S.C. 154(b) by 0 days.

(21) Appl. No.: 11/764,849

(22) Filed: Jun. 19, 2007

(65) Prior Publication Data

US 2008/0313049 A1    Dec. 18, 2008

(30) Foreign Application Priority Data

Jun. 12, 2007   (CN) .................. 2007 1 0110846

(51) Int. Cl.
*G06F 17/30* (2006.01)
(52) U.S. Cl. .......................... 705/26; 705/27
(58) Field of Classification Search ............ 705/26, 705/27
See application file for complete search history.

(56) References Cited

U.S. PATENT DOCUMENTS

| | | | |
|---|---|---|---|
| 5,819,092 A | | 10/1998 | Ferguson et al. |
| 6,269,361 B1 * | | 7/2001 | Davis et al. ................ 707/3 |
| 6,978,263 B2 | | 12/2005 | Soulanille |
| 7,130,081 B2 | | 10/2006 | Nose et al. |
| 7,191,147 B2 | | 3/2007 | Heene et al. |
| 2005/0256766 A1 | | 11/2005 | Garcia et al. |
| 2006/0122882 A1 | | 6/2006 | Brown et al. |
| 2006/0212790 A1 | | 9/2006 | Perantatos et al. |
| 2006/0235860 A1 * | | 10/2006 | Brewer et al. ............... 707/100 |
| 2007/0027773 A1 | | 2/2007 | Lee |
| 2007/0255702 A1 | | 11/2007 | Orme |

OTHER PUBLICATIONS

PayForPlacement, Feb. 4, 2002 http://edition.cnn.com/2002/TECH/internet/02/04/search.engine.lawsuit.idg/index.html.*

* cited by examiner

*Primary Examiner*—Yogesh C. Garg
*Assistant Examiner*—Matthew Zimmerman
(74) *Attorney, Agent, or Firm*—Louis Ventre, Jr.

(57) ABSTRACT

A computer implemented method for dynamic reordering an online list is disclosed. An embodiment of the invention provides the user with the ability to change the position of an item displayed on the list and this change is seen by all users who are browsing this list. The user provides information on the selection of the item for which the position is to be changed. The user also provides information on the new position for the item. The list is reordered based on the new position information of the item provided by the user, such that the selected item is at the new position. This reordering of the list is in real-time. The view of all users browsing through the item list is affected. Alternatively, an updated list is displayed to users after a fixed interval of time. The user can be billed every time the item is repositioned.

9 Claims, 13 Drawing Sheets

METHOD AND MEDIUM OF BILLING VIEWERS WHO DYNAMICALLY REORDER A LIST OF ADVERTISEMENTS

FIELD OF INVENTION

The present invention relates generally to an online list management method and system. More specifically the present invention relates to system and method for user-enabled dynamic positioning of online classifieds.

BACKGROUND OF THE INVENTION

Advertising is the paid promotion of goods, services, companies and ideas by a sponsor. Different mediums are used for such promotion, including television, radio, magazines, newspapers, the Internet, movies etc. Advertisements are usually placed at a strategic position to attract the attention of the potential customers.

The huge popularity of Internet as a medium of information has made it an important forum for posting advertisements. The concept of online advertising has gained popularity because of the advantages it offers over advertising in newspapers or printed publications.

The internet makes it easier for consumers to search and learn about products and purchase them at any time. Online advertisements can be easily and quickly updated to reflect any changes in product information. Photographs can be easily included in online advertisements. Examples of online advertisements include Banner ads, Fly-outs, Pop-Ups, Pop-Unders, Skyscrapers, classified listings etc. In some cases, for example in some classified listings, the purchaser does not have a choice over the position of the advertisement. In such cases, the advertisements are posted at predefined positions on the web page. In other cases, for example in the case of some banner ads, online advertising requires purchasing of an advertising space or position on a web page by an individual or an organization.

The cost of an advertisement generally depends on the size of the advertisement, position of the advertisement on the web page, and to some extent on the timing of the advertisement (i.e., the instant of time when the advertisement is displayed to a user). Generally, bigger the advertisement, higher is the cost associated with the purchase of advertising space. So for example, a bigger banner ad will be costlier than a smaller one. The position of the advertisement on the web page is another crucial aspect governing the cost. A properly placed advertisement is more likely to attract the attention of the web page viewer than an improperly placed advertisement and therefore command a higher price. In some cases, the timing of the advertisement plays a significant role in deciding the cost of advertising. For example, an advertisement that appears in a morning newspaper is likely to cost more than similar advertisements that appear in newspapers published during other parts of the day.

Most online advertisement systems do not take the abovementioned factors into account for determining the pricing of the advertisements. In most systems, the advertisement owner or sponsor has little or no control over the position of the advertisement on the web page. Even those systems that provide some flexibility to the owners over positioning advertisements, generally do not consider pricing while the positioning of the advertisement. Such systems charge uniformly for all advertising spaces. An example of such a system is online classified listings. In online classified listings, the list of advertisements is generally in random order and the advertisement owners generally do not have a choice over the position of their advertisement in the listing. This may cause the advertisement owner paying a higher price for an ineffective advertisement space.

In some systems, the advertisement owner has a choice over the positioning of his advertisement on the web. For example, the owner may have the choice over the position and the size of the banner ad. In such systems, the interested individuals or organizations bid for a particular advertising space on the web page. The highest bidder gets the particular advertising space. However, the highest bidder oftentimes pays far more money for a particular advertising space without true realization of the effectiveness of the space. Moreover, such systems do not give the advertiser the flexibility to change their advertisement positions in a real time manner. The procedure for changing the position of the advertisement is lengthy and cumbersome and any frequent changes in the positioning of the advertisement are likely to result in time and monetary losses. Such losses may tempt the advertisement owner to refrain from changing the position of his/her advertisement.

Certain systems (for example, GOOGLE personalized page) do allow for users to change the position of items on their page. However, such systems change the view for the owner of the page only. It does not affect the view of all other users browsing the site.

Sites like MSN SPACE or GOOGLE offer the drag and drop function for users to customize their homepage or personal space. However, it is not used for ranking the information, nor is it associated with payment. In GOOGLE, one person's personalized homepage is only available to that individual and other people cannot see what the customized page looks like. Therefore, every time a drag and drop operation is performed on a particular item, it only affects the view of the individual performing the drag and drop operation. In MSN SPACE, only the space owner can re-organize the different items on the page. As a visitor, one can only see the changes the space owner has made to the page, but cannot make any changes to it.

In light of the abovementioned drawbacks of existing systems, there is a need for a system that enables an individual or an organization to place their online advertisement at position of their choice on the web page in a cost-efficient manner. The system should also enable its users to change the position of the advertisement on the web page depending on the business requirements.

BRIEF SUMMARY OF THE INVENTION

A computer implemented method for dynamic reordering of an online list is disclosed. The method and system in accordance with an embodiment of the invention provides a user with the ability to change the position of an item displayed on the list and this change is seen by all users who are browsing this list. The user provides information on the selection of the item for which the position is to be changed. The user also provides information on the new position for the item. The list is reordered based on information about the new position of the item provided by the user. The entire positioning of the items on the list is reordered such that the selected item is at the new position. This reordering of the list can be done in a real-time manner. The view of all users browsing through the item list is affected. The reordering of the list can also be done at fixed intervals of time where an updated list is displayed to all users after the fixed interval of time. The user can be billed every time she/he changes the position of the item.

DETAILED DESCRIPTION

Definitions

Figure 1:
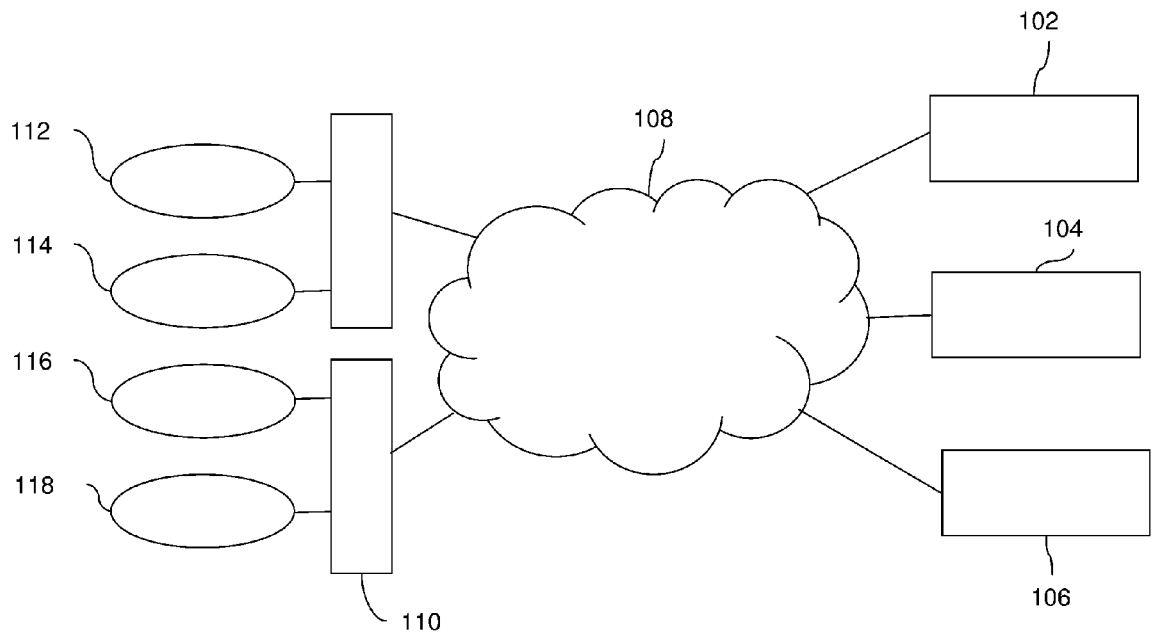
FIG. 1 is an overview of the environment in accordance with an embodiment of the invention.

Item: Items include a word, a line (or lines) of text, a visual image, a designed graphic, a video, a combination of all these, or any other object that can be selected on the web page. An item may be posted by a user on a web page or be computer generated. Each item is assigned a unique ID, which can be used for searching the item. For example, an item can be a listing of a product or a service on a web page. In such a case, for a buyer of the product or the service, an item would entail a description of the buyer's requirement of the product/service while for a seller, the item would entail a description of the product/service that the seller has up for sale. The item can also be an announcement such as a birthday message or a dating message posted by a user.

List: A list is a series of items that are displayed to a user, for example, a list of classified advertisements. The relative orientation of items on the list is important. The orientation of the items on the list can be horizontal, vertical, or spatial. In case of vertical listing, the position of the item can also be termed as the rank of the item on the list.

Owner: An owner is any individual that places an item on the list, or has access rights to change the contents of the item.

User: A user is any individual that views the online list. The user can also be the owner of an item on the list.

Position: Position (P) is the location of an item in a list of items.

Category: List of items that are similar in content are collectively gathered and managed as a category. For example 'Cars' can be a category that contains a list of items relating to cars provided by different manufacturers. Within this category, there could be sub-categories, for example, second hand cars. Another example of category could be the 'dating' category which includes lists of items posted by people interested in dating.

InfoType: There are two types of items—InfoType A is "I Want" item, and InfoType B is "I Have" item. For example, the 'I Want' item is intended for users who want to purchase a particular item, find a particular service, or find a job. The 'I Have' item is intended for users who want to sell a particular item, provide a particular service, or just have something to offer. Each Infotype has different categories, with each category having a plurality of lists. For example, the seller of a car will choose the 'I Have' item and subsequently will choose 'Cars' category.

Shift Index (SI) is a natural number value that is generated the first time an item is moved by drag and drop, and increases every time an item is moved by drag and drop.

Popularity Index (PI) is a natural number value that reflects the number of users that have performed drag and drop operation on a particular item.

Position Knockout (PK) is the term for the process in which the user alters the position of an item by drag and drop on a web page.

Charge Line (L) is a natural number value that indicates the separation line above which the users are charged for altering the position of an item. For example, if L=10, then users who drag their item at positions 1-10 on the item list page will be charged for that action. Anyone whose item is positioned anywhere past the 10th position will not be charged.

M is the cost of performing one single drag and drop operation on one item.

$\Sigma M$ is the cumulative costs of all the drag and drop operations charged to a user for one item during one round of PK action.

DESCRIPTION OF THE INVENTION

A computer implemented method for dynamic reordering of an online list is disclosed. The method and system in accordance with an embodiment of the invention provides the user with the ability to change the position of an item displayed on the list and this change is seen by all users who are browsing this list. The user can select the item on the list whose position needs to be changed, and determine the new position for the item. The list is reordered based on the new position of the item determined by the user and the reordered list is displayed to the user. The reordering of the list is done in a real-time manner. The reordered list can then be displayed to the users either in real time or after a fixed interval of time. The fixed interval of time is also referred to as a round. The user can be billed every time she/he changes the position of the item.

FIG. 1 is an overview of the environment in accordance with an embodiment of the invention. The environment illustrated in FIG. 1 is related to purchase/selling of items over a network. Owners 102, 104, and 106 place a listing of their items over a network 108. In an embodiment of the invention, owners 102-106 put an item on a list. The network can be a Local Area Network, Wide Area Network, or the Internet. It must be apparent to a person skilled in the art that the invention is not limited to a network alone. Any gateway wherein a user can interact with another system such as a mobile telecommunication system, an interactive television system and the like can be used without deviating from the scope of the invention. The list of items, viewable over the network, is also referred to as an 'online list'. A User Interface 110 facilitates the viewing and easy placement of the items on the list. In an embodiment of the invention, user interface 110 is a web browser. User interface 110 can also be a desktop application, or any other form of displaying content to a user on a display screen. Users 112, 114, 116 and 118 are able to view the online list placed by the owners 102, 104 and 106. Correspondingly, users 112-118 can also place a listing of their requirements in the online list. In an embodiment of the invention, users 112-118 are buyers looking to purchase items. In this embodiment, the listings are classified advertisements displayed on a computer screen to users. The computer is connected to the Internet. The user has access to the web pages and the advertisements displayed on them and can view them on a web browser.

It will be apparent to a person skilled in the art that the concept of online classifieds as used for the above description is merely exemplary in nature, and that the present invention is applicable to any form of listings in a networked environment without deviating from the scope of the invention.

Figure 2:
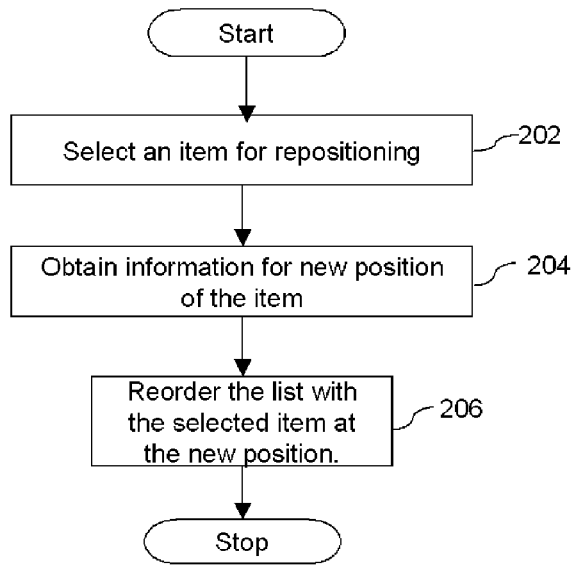
FIG. 2 is a flow diagram showing an overview of the method for dynamic reordering of an online list in accordance with an embodiment of the invention.

FIG. 2 is a flow diagram showing an overview of the method for dynamic reordering of an online list in accordance with an embodiment of the invention. At step 202, a user can select an item from an online list. In case of viewing through a web browser over the Internet, the user can simply select the item by placing the mouse cursor over the item. Alternatively, the user can click on the item to select it. Several other forms of selecting an item can also be used without deviating from the scope of the invention. For example, the user can send a message containing an item code for the item to be selected. Item code can be any identification code that uniquely represents the item. For example, an e-mail or an SMS could be sent regarding the choice of the item.

At step 204, the user provides information on a new position for the selected item. The new position can be a new rank of the item on the list that is different from the item's current rank. Alternatively, the new position can be a different spatial orientation of the item. In an embodiment of the invention, the user can drag the selected item from its current position and drop it to the new position. Details of the drag-and-drop operation are further discussed in conjunction with FIG. 4.

At step 206, the position of items on the list is reordered. The reordering is done such that the selected item is placed at the new position. In case of a vertical list of items, the item that was earlier at the selected new position is pushed down by one rank. Likewise, all items between the old position and the new position are pushed down by one rank. Details on the reordering are discussed in conjunction with FIG. 4.

Hereinafter, the invention will be discussed with respect to a particular embodiment. The embodiment relates to the list of online classifieds. The following description is presented to enable any person skilled in the art to make and use the invention. For purposes of explanation, specific nomenclature is set forth to provide a thorough understanding of the present invention. Descriptions of specific applications are provided only as examples. Various modifications to the preferred embodiments will be readily apparent to those skilled in the art, and the general principles defined herein maybe applied to other embodiments and applications without departing from the spirit and scope of the invention.

Figure 3:
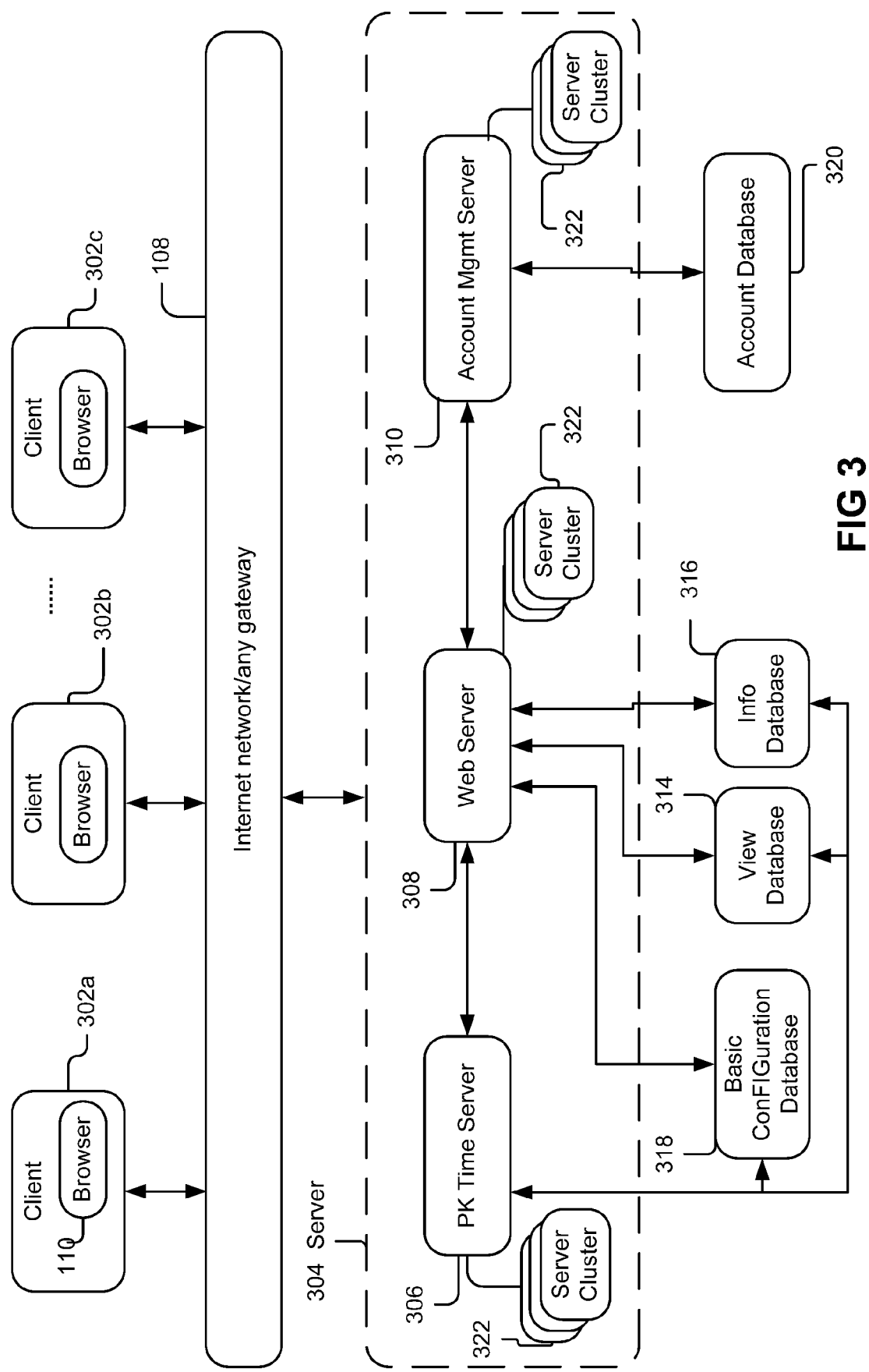
FIG. 3 illustrates an overview of the client-server system in accordance with an embodiment of the invention.

FIG. 3 illustrates an overview of the client-server system in accordance with an embodiment of the present invention. Clients 302a, 302b, 302c interact with server 304. This interaction can be direct, or through network 108. User interface 110 is an application that sits on client 302, and can be used to retrieve HTML WebPages from the server via internet network. In an embodiment of the invention, user interface 110 is a browser. The browser interprets HTML into words and graphics that are viewable on the web page.

Client 302 uses user interface 110 (in this case the browser) to browse through the web pages stored on a PK time server 306, a web server 308, and an account management server 310 via network or gateway 108. Gateway 108 can be an SMS gateway, interactive TV or Internet. The browsing is done through web server 308. A user can send requests to perform various activities such as post new items, manage own account and pre-payment, browse information, and influence the position of an item through a direct drag and drop action. These requests are sent through client 302. The change in position of one item affects the view of all Clients 302. Web server 308 controls all the other servers in responding to client 302 requests. Web server 308 also executes requests from client 302.

PK time server 306 is a server or a group of servers. It stores and manages a number of pre-set time periods otherwise defined as "Rounds", and at the end of each round, updates the relevant View database 314 and Information database 316. As stated, a round is the fixed interval of time after which a reordered static list is displayed to the users. All users can perform PK action during the rounds. Details of a round are also discussed in conjunction with the discussion of the drag and drop operation in FIG. 4.

Web server 308 is a server or a group of servers connected to the internet. It accepts various requests from client 302, and directs the various servers to execute the requests. For example, when client 302 requests the item list of a particular category, through the browser, Web server 308 retrieves the item list of the relevant category from Info database 316, and responds to the browser on client side. Web server 308 also manages basic configuration database 318, View database 314 and Info database 316.

Account management server 310 is a server or a group of servers. It manages the users' account including pre-payment functions, and execution of the payment process. Account management server 310 also manages the account database 320.

Server cluster 322 is a group of servers using server grouping software/hardware, to support applications and operations via Local Area Networks. There are web server clusters, PK time server clusters, and account management server clusters.

Information database 316 (also referred to as info database) is a server or a group of servers using DBMS to store the item listings and the relevant SI, PI, and other data of all items. This information is updated on a real time basis in the database. In case of classified advertisements, the database is categorized by information type, i.e., 'I Have' Info and 'I Want' Info. In each Info type there are different categories, for example, 'Cars'. The item listings are stored separately into these categories depending upon the category into which they fall. It will be apparent to a person skilled in the art that the content of the lists in the Information database mentioned here is merely exemplary in nature.

View database 314 is a server or a group of servers using DBMS database management software that stores the position and content of all items above a charging line 'L' at the end of the last PK round. Examples of Database Management System (DBMS) include ORACLE, MICROSOFT, SQL SERVER, IBM DB2, MYSQL, BORLAND INTERBASE, etc. Details of the data structure used in View database 314 are discussed in conjunction with FIG. 12.

Basic configuration database 318 is a server or a group of servers using DBMS to store various basic configuration data, including categories, infotypes, the position of L, price of single a drag and drop operation, etc.

Account database 320 is a server or a group of servers using DBMS that stores the account name, password, available balance, financial records etc. of all users. The user can make a payment and update its balance in the account database. The balance in the account database can be used to make payment for changing the position of an item in any list.

Figure 4A:
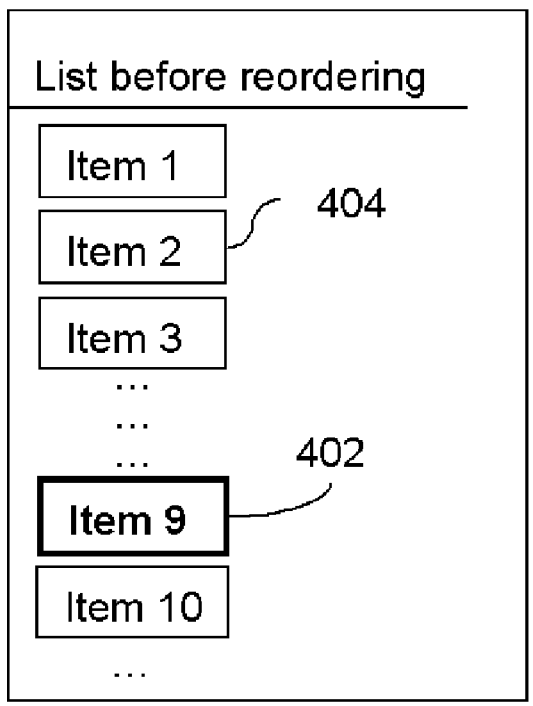
FIGS. 4A-C are schematics of the drag-and-drop operation in accordance with an embodiment of the invention.
Figure 4B:
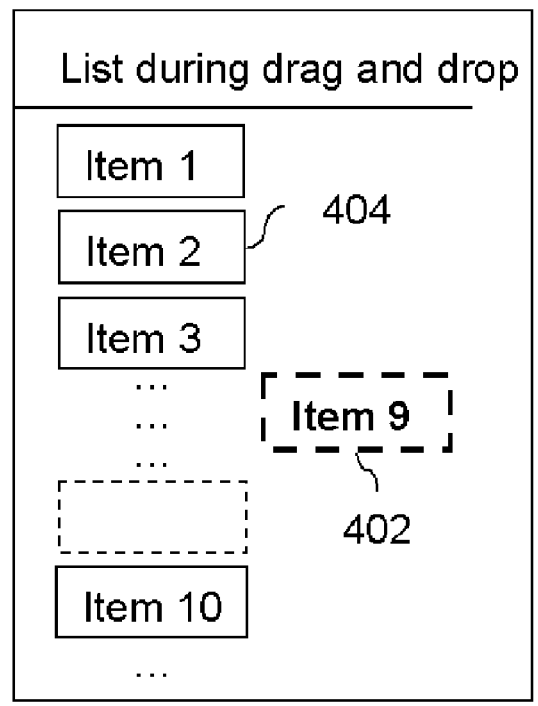
Figure 4C:
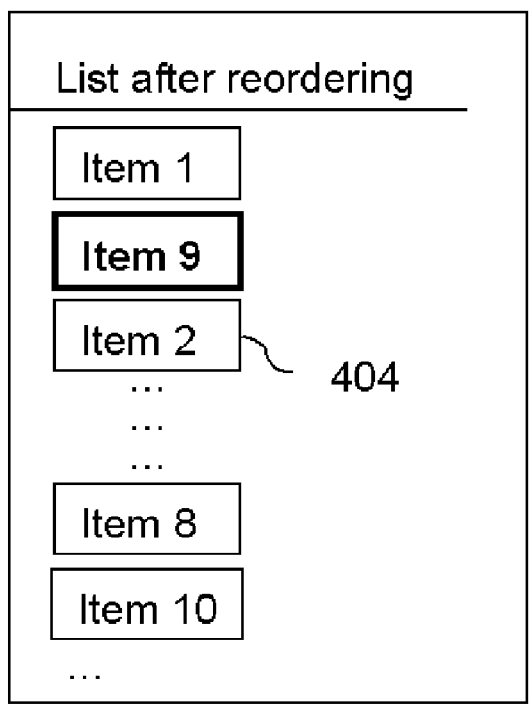

FIGS. 4A-C are schematics of the drag-and-drop operation in accordance with an embodiment of the invention. In FIG. 4A, the user selects item 402 through the click of a mouse. In figure FIG. 4B, the user 'lifts' item 402 from its current position and carries it to the desired position by holding item 402 with the cursor. In FIG. 4C, the user releases item 402 at the desired position by releasing the mouse button. Item 404, that was originally located at the desired position, moves a step down. All items between the original position of item 402 and the new position also move a step below as shown in FIG. 4C.

In an embodiment of the invention, users are provided with two separate views of the list of items. In one view, users can change the position of the items (hereinafter referred to as a dynamic list), while on the other they cannot (hereinafter referred to as a static list). The position of items in the dynamic list can be changed through the drag-and-drop operation in a real time manner. The static list display changes after a fixed interval of time and cannot be changed directly by the user. One cycle of the periodic change in the static list is referred to as a round. The time period of a round can be predefined. In an embodiment of the invention, the duration of a round is one hour. It will be apparent to a person skilled in the art that the duration of the round can be any predefined length of time without deviating from the scope of the invention.

The position of items in the dynamic list, which is being modified continuously by different users logging into the system during any round, changes in a real time manner. The modifications are stored in the information database in a real time manner. Details on updating of information database 316 are discussed in conjunction with FIG. 6. The items in the dynamic list, along with their respective positions in the list, are 'captured' at the end of every round.

The static list, during any round comprises of items of the dynamic list captured at the end of previous round. The position of items in the static list remains unchanged throughout the round. At the end of the round, the existing static list is replaced by the most recent dynamic list. Thus, the changes above the charging line made by all the users in the dynamic list during a round are represented in the form of a static list in the next round. The item listing in the static list is stored in view database 314 which is updated at the end of every PK round. The updating of view database 314 with any round has been discussed in conjunction with FIG. 5.

The user can change the dynamic list during any round of PK action. According to an embodiment of the invention, the user can only move an item up in the list hierarchy and not down. An item can be moved from its current position to a position above the charging line only by the owner of the item. An item can be moved up from its current position to any position below the charging line by any user. The owner is charged for moving an item above the charging line. The new SI and PI of the item is calculated and stored in the Information database. The Information database is updated after each drag-and-drop operation.

Figure 5:
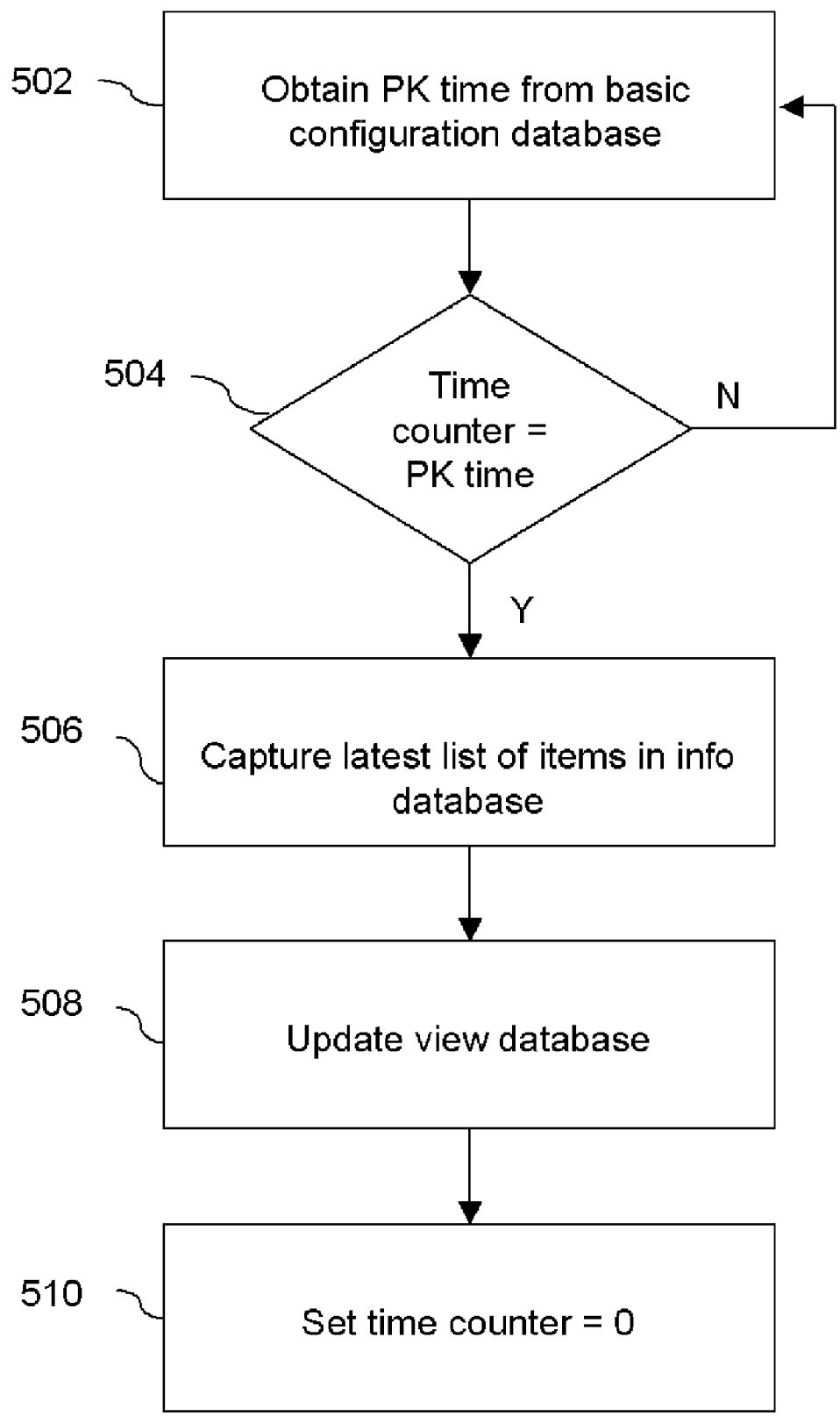
FIG. 5 demonstrates how view database 314 is updated with any round of PK action in accordance with an embodiment of the invention.

FIG. 5 demonstrates how view database 314 is updated with any round in accordance with an embodiment of the invention. PK time server 306 maintains a time counter from the start of every round. At step 502, PK time server 306 receives the PK time from basic configuration database 318. The PK time is the time duration for one round. At step 504, the PK time counter continuously checks if the time counter has reached the PK time. After the time counter has reached the PK time, then at step 506, PK time server 314 'captures' the most recent list of items present above the charging line in information database 316. At step 508, view database 314 is updated with this latest list of items from information database 316. The time counter is again set to zero for the next round at step 510.

Figure 6:
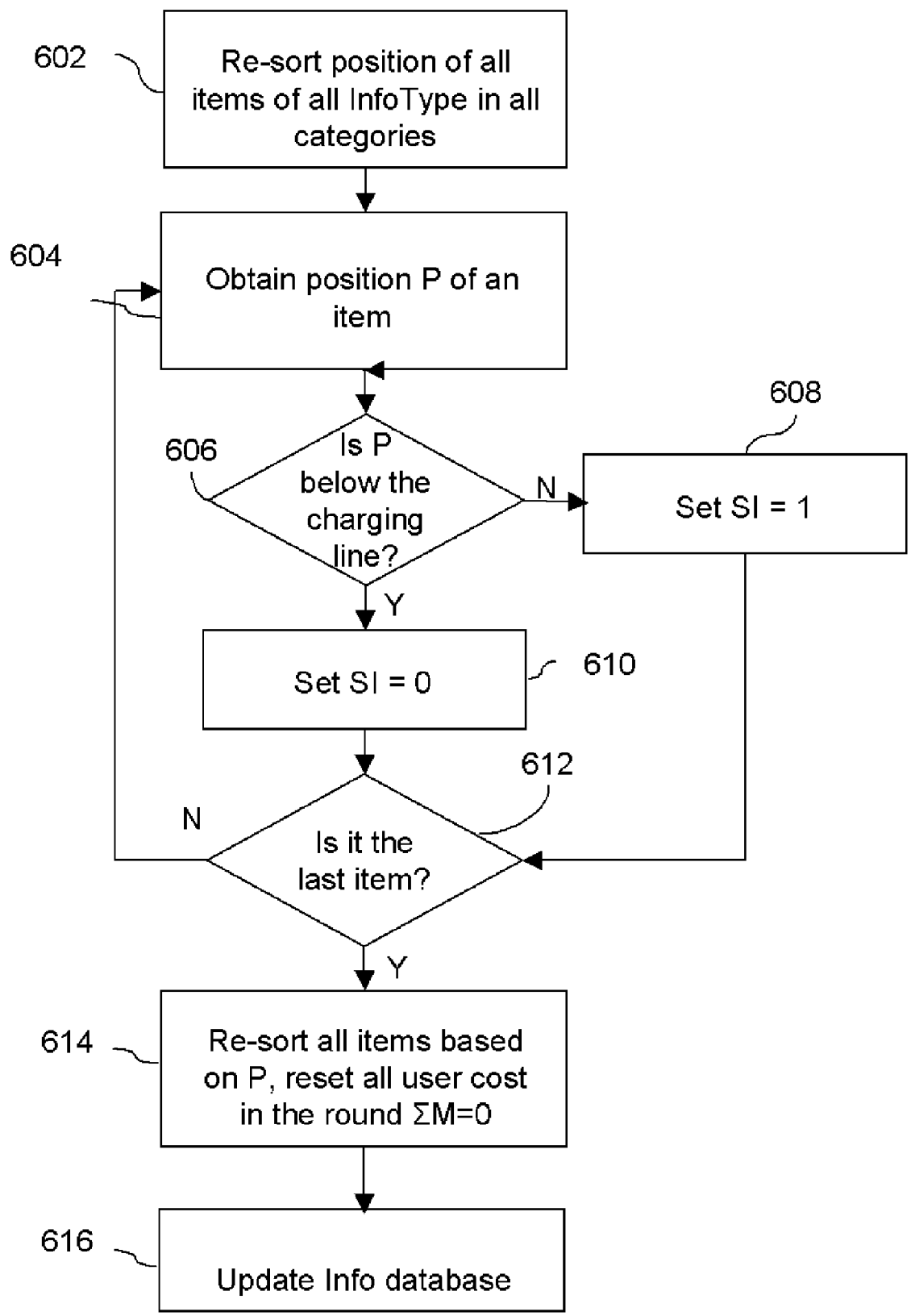
FIG. 6 demonstrates how the info database 316 is updated with any round of PK action in accordance with an embodiment of the invention.

FIG. 6 demonstrates how info database 316 is updated with any round of PK action in accordance with an embodiment of the invention. The round starts with an info database that has lists of items. Each position in every list has an SI and PI which is inherited from the previous round. At step 602, the item lists of all info types in all categories are repositioned based on SI and PI. At step 604, the position P of an item is obtained. At step 606, it is checked whether the position P of the item is below the charging line. In case the position P is above the charging line, the SI of the items is reset to one at step 608. In case the position P is below the charging line, the SI of the item is reset to zero at step 610. At step 612, it is verified whether the SI of all items has been reset. If not, steps 604-612 are repeated till the SI of all items is reset. At step 614, all user costs in this round are reset to zero. User cost is the total cost incurred by the user for the total drag and drop operations carried out during a round. Details regarding the user costs are further discussed in detail in conjunction with FIG. 7. At step 616, info database 316 is updated with all changes relating to the items. The changes made in different lists by users during a round are incorporated in info database 316 in a real time manner. The changes in the SI and PI due to the changes in the lists are also incorporated in info database 316 in a real time manner. The contents of info database 316 are captured in view database 314 at the end of each round.

Figure 7A:
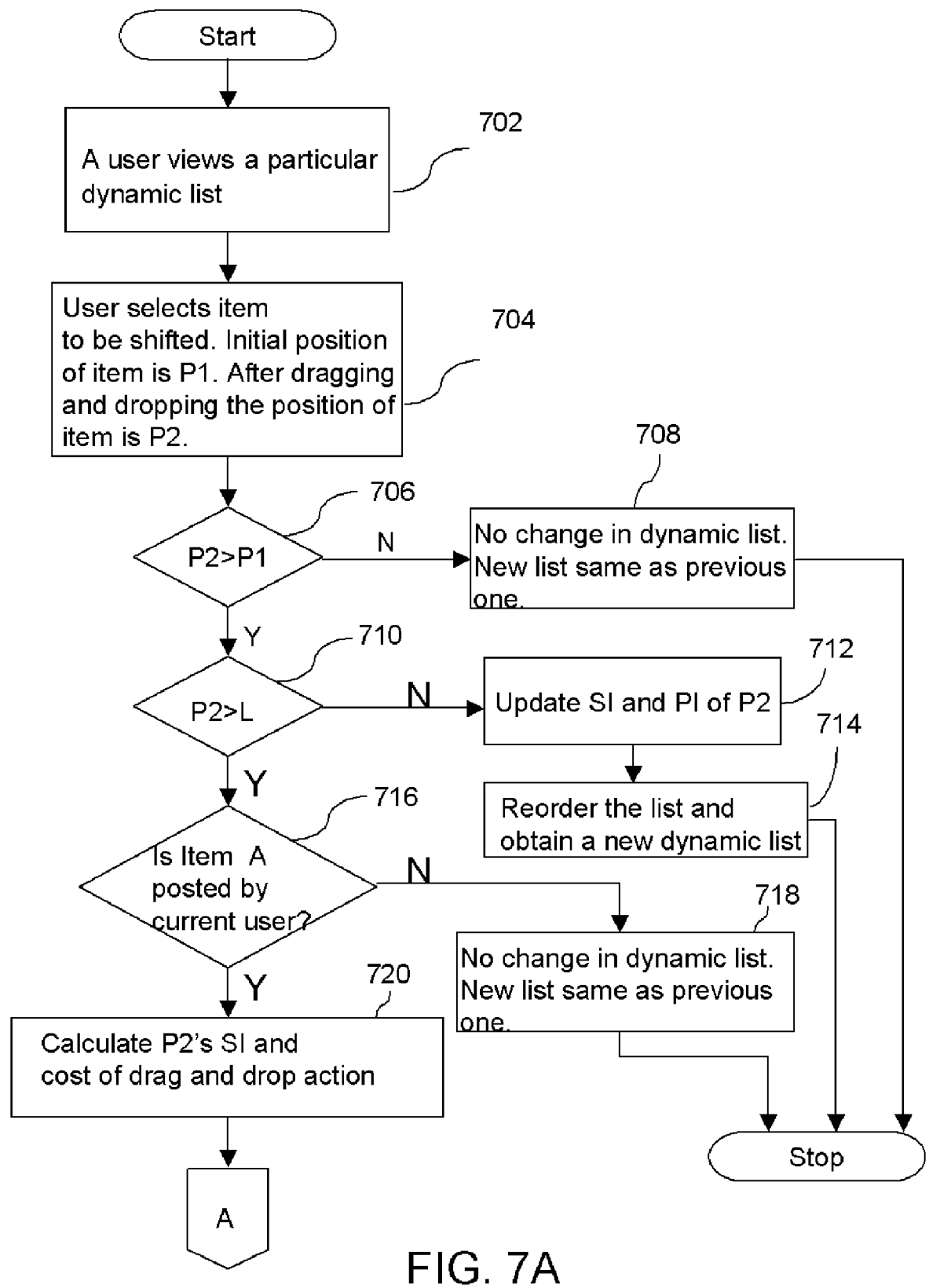
FIG. 7 is a flow chart illustrating the system response to the request from a user for change in position of an item in the list in accordance with an embodiment of the invention.
Figure 7B:
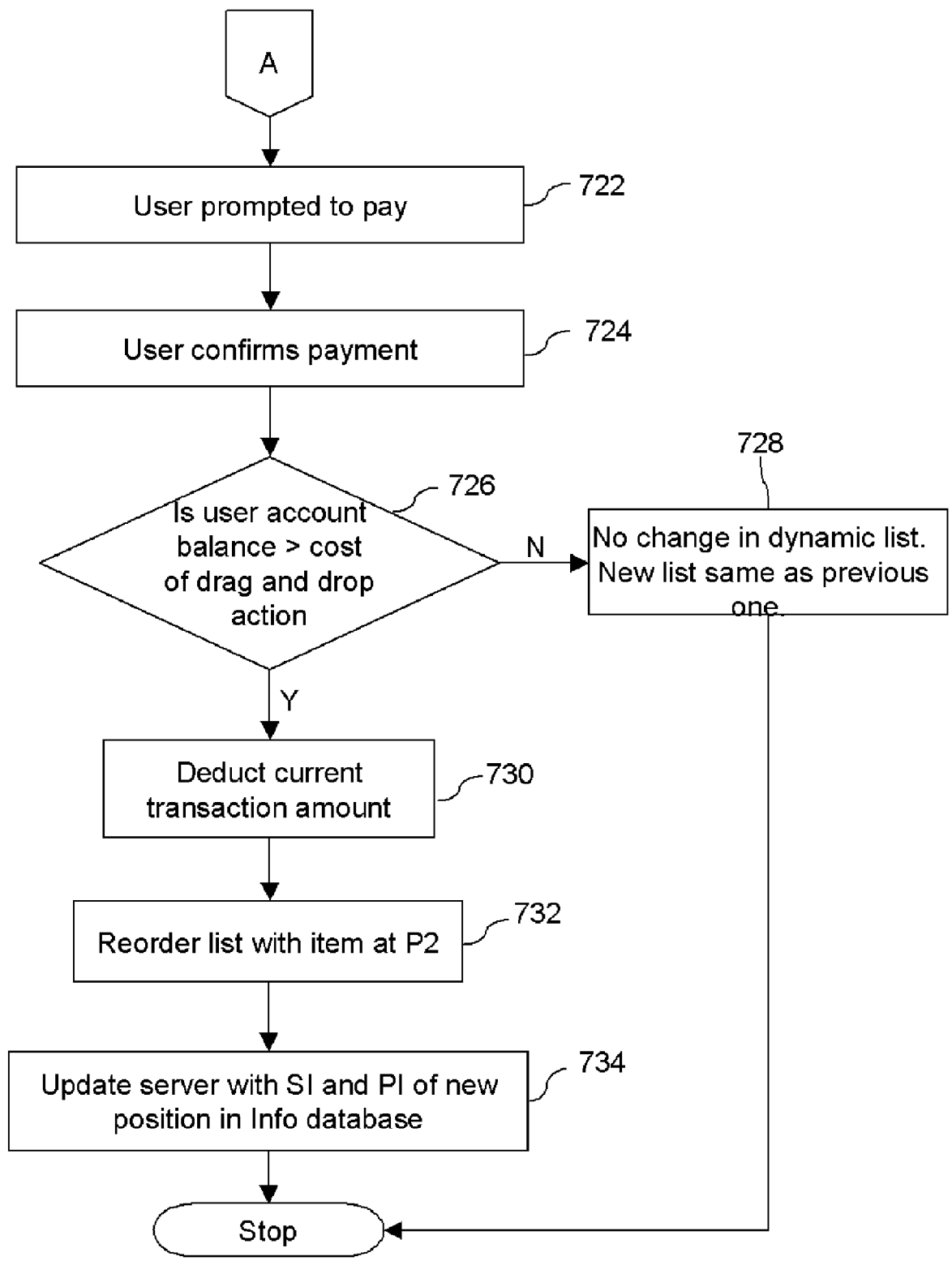

FIG. 7 is a flow chart illustrating the system response to the request from a user for change in position of an item in the list in accordance with an embodiment of the invention. At step 702, a dynamic list is presented to the user. The list comprises a plurality of items arranged in a particular order. Every item in the list has a SI and a PI. At step 704, a user selects a particular item whose position is P1. The user drags-and-drops the item to a desired position P2. The SI of the item at position P2 before the drag-and-drop operation is SI2. The SI of the item at position P2 after the drag and drop operation becomes SI2+1. At step 706, the system checks if the new position of the item is above the old position or not (i.e., P2>P1). In case the item is being dragged down by the user (i.e., P2<P1), the drag-and-drop action is cancelled and the list remains unchanged at step 708.

At step 710, in case of the item being dragged upward by the user, the system checks if the new position of the item is above the charging line or not. The system allows only the owner of the item to shift the item above the charging line. In case the new position is below the charging line, the system allows the shift by any user. At step 712, the web server updates the SI and PI of the item at new position P2, in Information database 316. At step 714, the list is reordered with the item at its desired position and the user browser is updated to present the reordered list.

At step 716, the system checks if the current user of the system is the owner of the item. In an embodiment of the invention, this step is performed only if the new position of the item is above the charging line. If the user is not the owner, the drag-and-drop action is cancelled and the list remains unchanged at step 718. In case the user is the owner, the system calculates the cost for the drag-and-drop action at step 720. The cost of a drag-and-drop operation is:

(SI of position P2−SI of position P1)*C, where C is some predefined cost.

The cost is conveyed to the user and the user is prompted to pay for the drag-and-drop operation at step 722.

At step 724, the user confirms the payment. This confirmation could be through a click of the mouse. In an embodiment of the invention, the user makes a pre-payment with the system. Details of the method of pre-payment are discussed in conjunction with FIG. 9.

At step 726, the system checks whether the available balance of the user is greater than the amount required for the current drag-and-drop transaction. This check is performed via account management server 310. In case the available balance of the user is less than the amount required for the current transaction, at step 728 the drag-and-drop action is cancelled and the list remains unchanged. In case the available balance is more than the current transaction, then at step 730, account management server 310 deducts the amount of the current transaction from the available balance and adds the account record to account history. The list is reordered with the item at the desired position at step 732. At step 734, the web server updates the SI and PI of the new position P2 in the Info database 316. The display, viewable to the user on his/her browser, is updated to present the reordered list.

In an embodiment of the invention, the user is charged for every drag and drop operation above the charging line during a round. However, in case at the end of the round, the user's item is below the charging line in the item list (i.e., P>=L) all cumulative costs for the item in this round (ΣM) is returned to the user's account. Therefore, the available balance for the user becomes S=S+ΣM at the end of the round in such a scenario.

Figure 8:
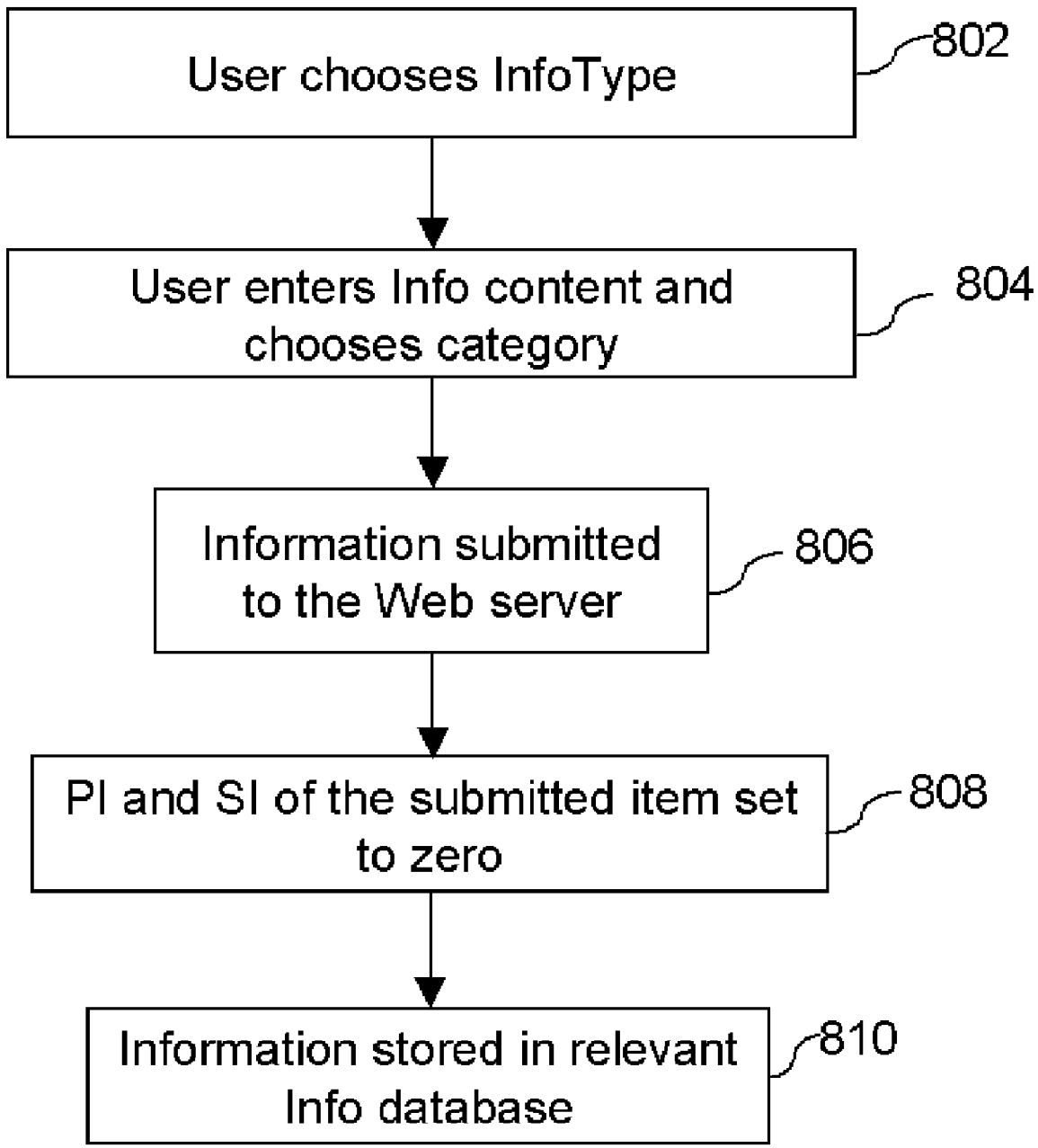
FIG. 8 is a flowchart illustrating the method for submitting an item into a list in accordance with an embodiment of the invention.

FIG. 8 is a flowchart illustrating the method for submitting a new item into a list by a user in accordance with an embodiment of the invention. Any new item is added to the dynamic list and the dynamic list is modified in a real time manner with the new item positioned at a predetermined position. The predetermined position can be at the bottom of the list. Alternatively, the predetermined position can be specified upfront by the user. It must be apparent to one skilled in the art that the predetermined position can be determined in any manner without deviating from the scope of the invention.

At step 802, the user selects the info type. A buyer will choose the 'I Want' infotype, while a seller will choose the 'I Have' option. At step 804, the user enters the information content and selects a category. At step 806, the user submits the completed item information to the web server. At step 808, the SI and PI of this new item are set to zero. At step 810, the item submitted by the user is stored in the Info database 316 in the respective info type.

Figure 9:
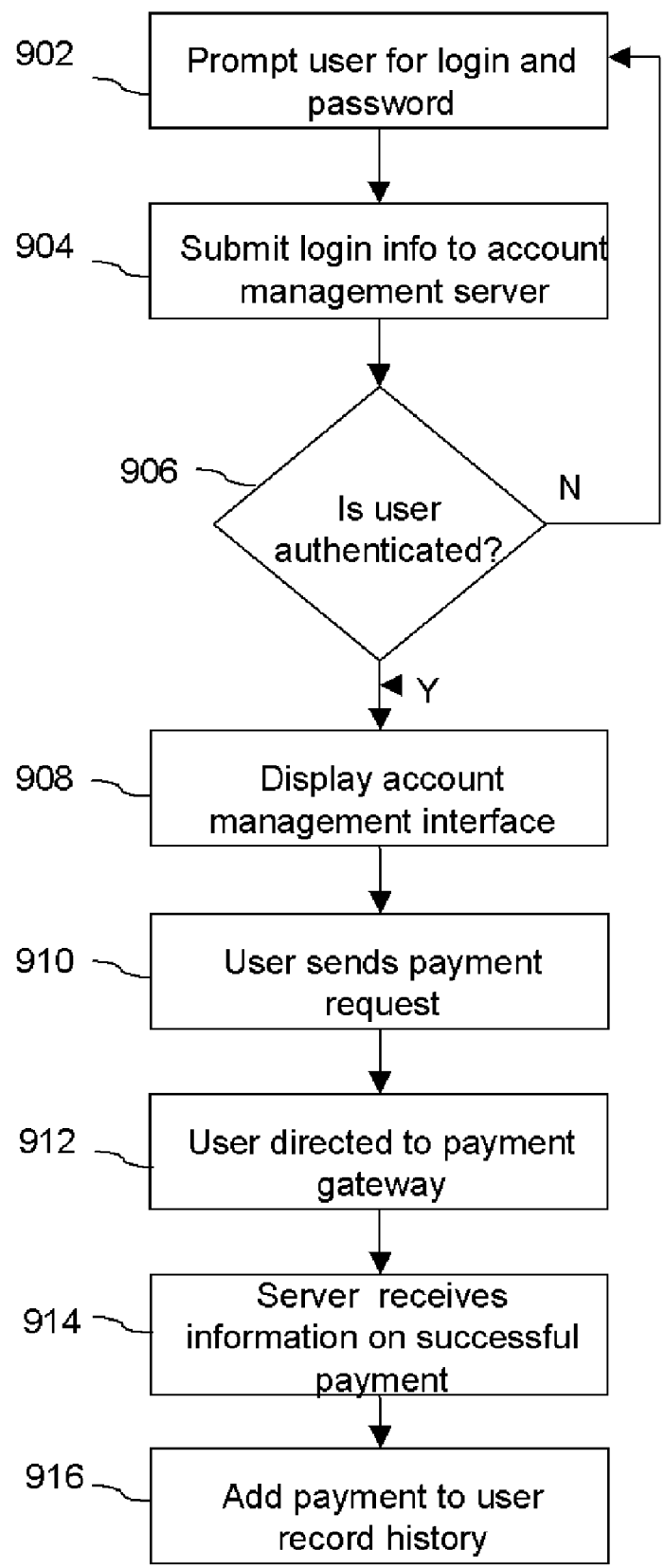
FIG. 9 is a flow chart illustrating the process of pre-payment by the user in accordance with an embodiment of the invention.

FIG. 9 is a flow chart illustrating the process of pre-payment by the user in accordance with an embodiment of the invention. At step 902, the user is displayed the login page and prompted for user name and password. User login information is submitted to the account management server 310 at step 904. At step 906, the login details of the user are verified by the account management server 310. Once the user is authenticated, the account management interface is displayed to the user at step 908. At step 910, the user sends a payment request for a certain amount to the server. In response to the user request, the server directs the user to the payment gateway for payment at step 912 where the user pays the specified amount. At step 914, the server receives the information of successful payment by the user. The server, then, updates the balance available in the user account in the account database by adding the current payment to the existing balance. At step 916, the account management server 310 adds the payment record to the user account history.

Figure 10:
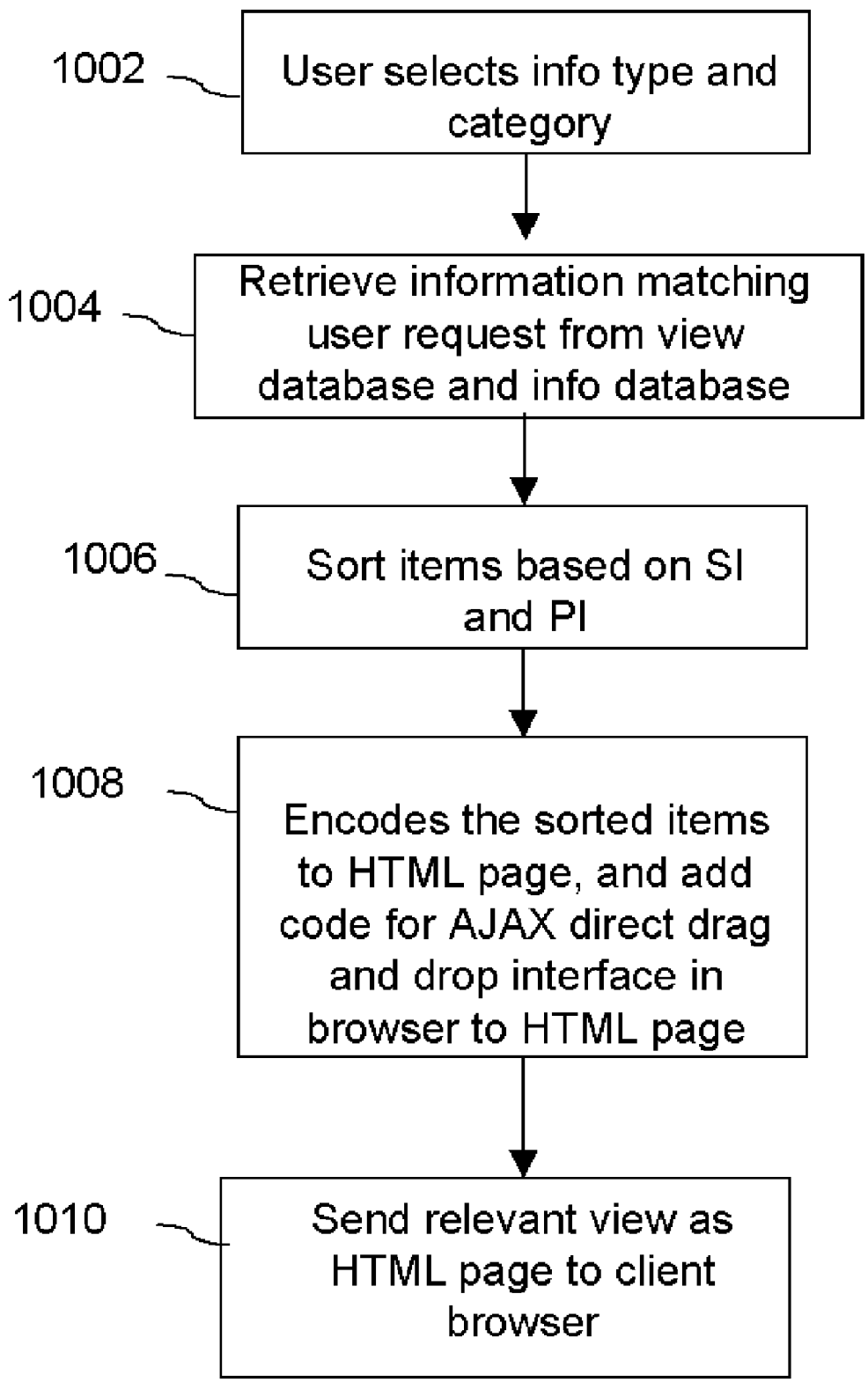
FIG. 10 is a flow chart illustrating the process at webserver 308 while the user is browsing the page of item listings in accordance with an embodiment of the invention.

FIG. 10 is a flow chart illustrating the process at webserver 308 while the user is browsing the page of item listings in accordance with an embodiment of the invention. At step 1002, the user selects the infotype and category to browse. After receiving a request from the user, at step 1004, the web server retrieves the information matching the user request from the info database 316 and the view database 314. For example, if the user selects infotype 'I Have' and the category 'Cars', then the server will retrieve the list of the car related items from the info database 316. The server will also retrieve the list of car related items of infotype "I Want" from the view database 314.

At step 1006, the items retrieved from the info database 316 and the view database 314 are sorted according to descending SI value. The items with the same SI value are sorted according to the descending PI value. The server encodes the sorted items to HTML page, and adds code for AJAX direct drag and drop interface in browser to HTML page at step 1008. Details of the implementation of drag and drop action are discussed in conjunction with FIG. 11.

The server sends the relevant view such as HTML page to client browser via internet at step 1010. The user can directly execute drag and drop action on the browser page.

Figure 11:
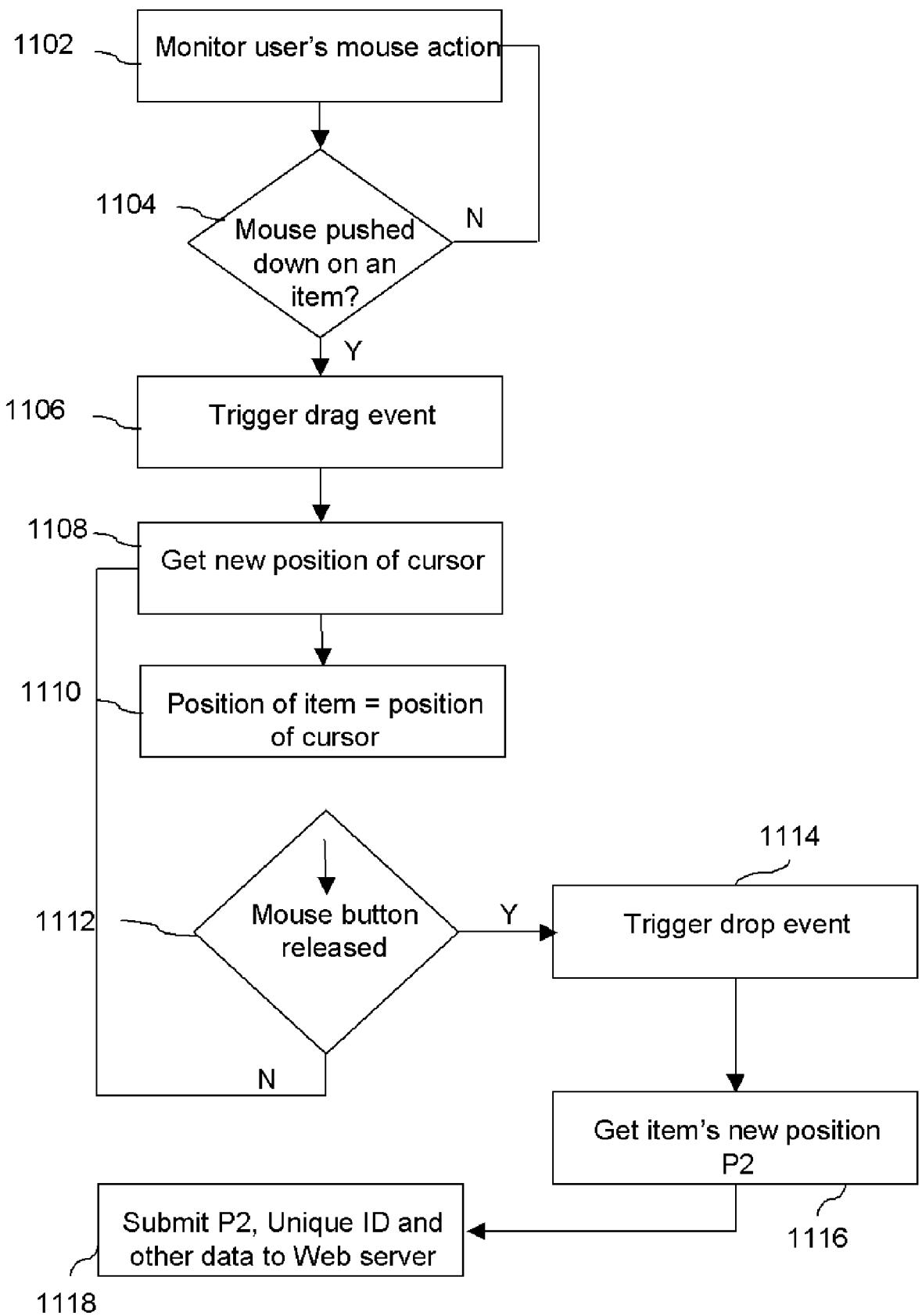
FIG. 11 illustrates the way to realize drag-and-drop action on a standard HTML page in accordance with an embodiment of the invention.

FIG. 11 illustrates the way to realize drag-and-drop action on a standard HTML page in accordance with an embodiment of the invention. At step 1102, the application in the client browser uses JavaScript code to monitor user's mouse action on the HTML page on the client browser. At step 1104, the application continuously checks if the user's mouse pushes down on an item. When the mouse pushes down an item, the application triggers a drag event at step 1106. At step 1108, the position of the cursor is obtained. The item moves with the cursor. At step 1110, the position of the item is updated with that of the cursor. At step 1112, the application constantly checks if the user has released the mouse button. If not, steps 1108-1112 are repeated. If released, a drop event is triggered at step 1114. At step 1116, item's new position P2 is obtained. At step 1118, the application submits P2, UniqueID and other data of the item to web server 308. Thereafter, the drag-and-drop operation is completed. The application returns to use JavaScript code to monitor user's mouse action on the HTML page on client browser.

Figure 12:
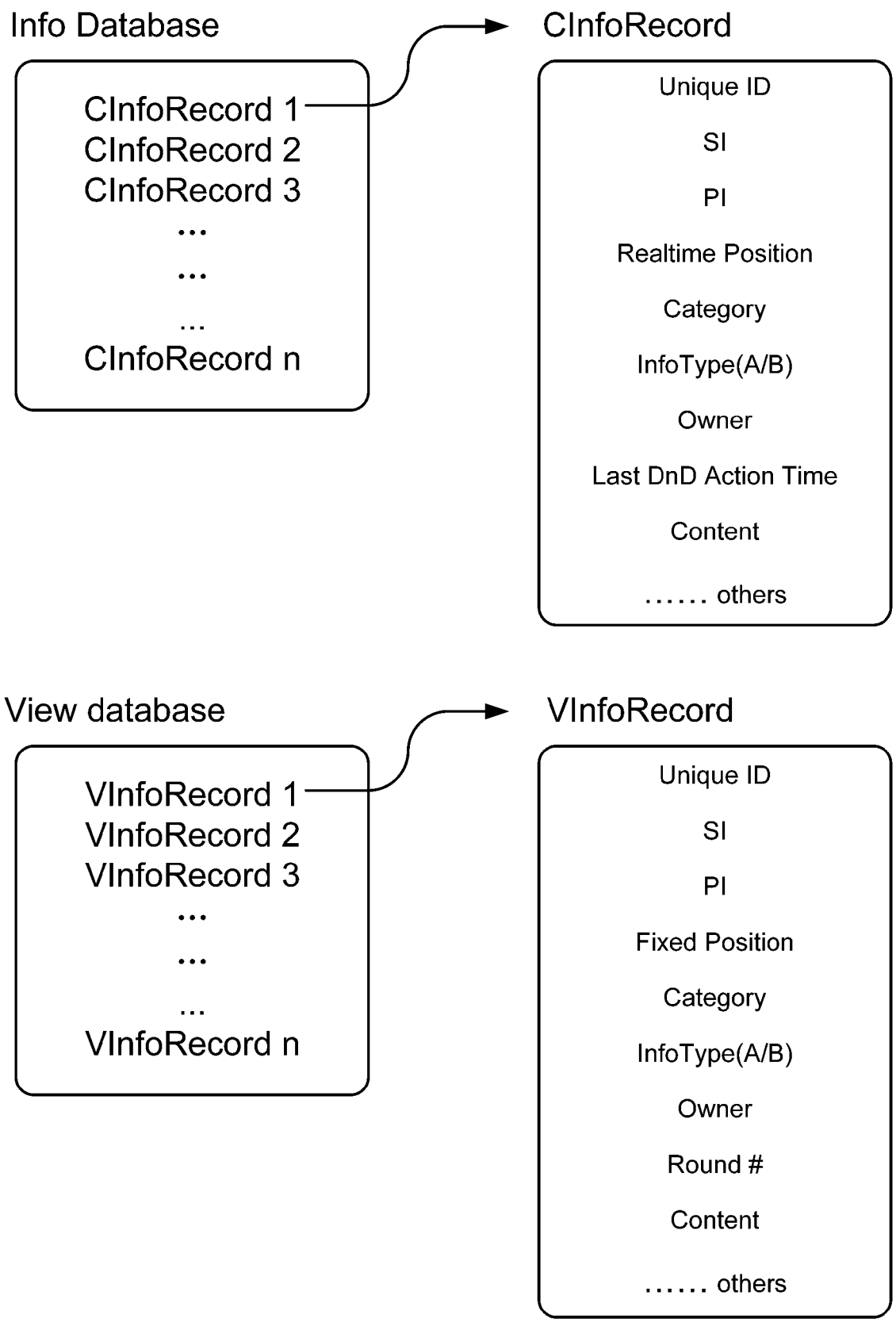
FIG. 12 is a diagram illustrating the basic data structure of Info database 316 and View Database 314 in accordance with an embodiment of the invention.

FIG. 12 is a diagram illustrating the basic data structure of Info database 316 and View Database 314 in accordance with an embodiment of the invention. Info database 316 contains records for items comprising the dynamic list (CinfoRecord 1 if the record for item 1 etc.) Each record contains information for an item under multiple fields (e.g., Unique ID, SI etc.).

View database 314 contains records for items in the static list. e.g., VInfoRecord 1 is for item 1 etc. Like records in info database 316, each record in view database 314 contains information of an item under multiple fields (e.g., Unique ID, SI etc.)

Figure 13:
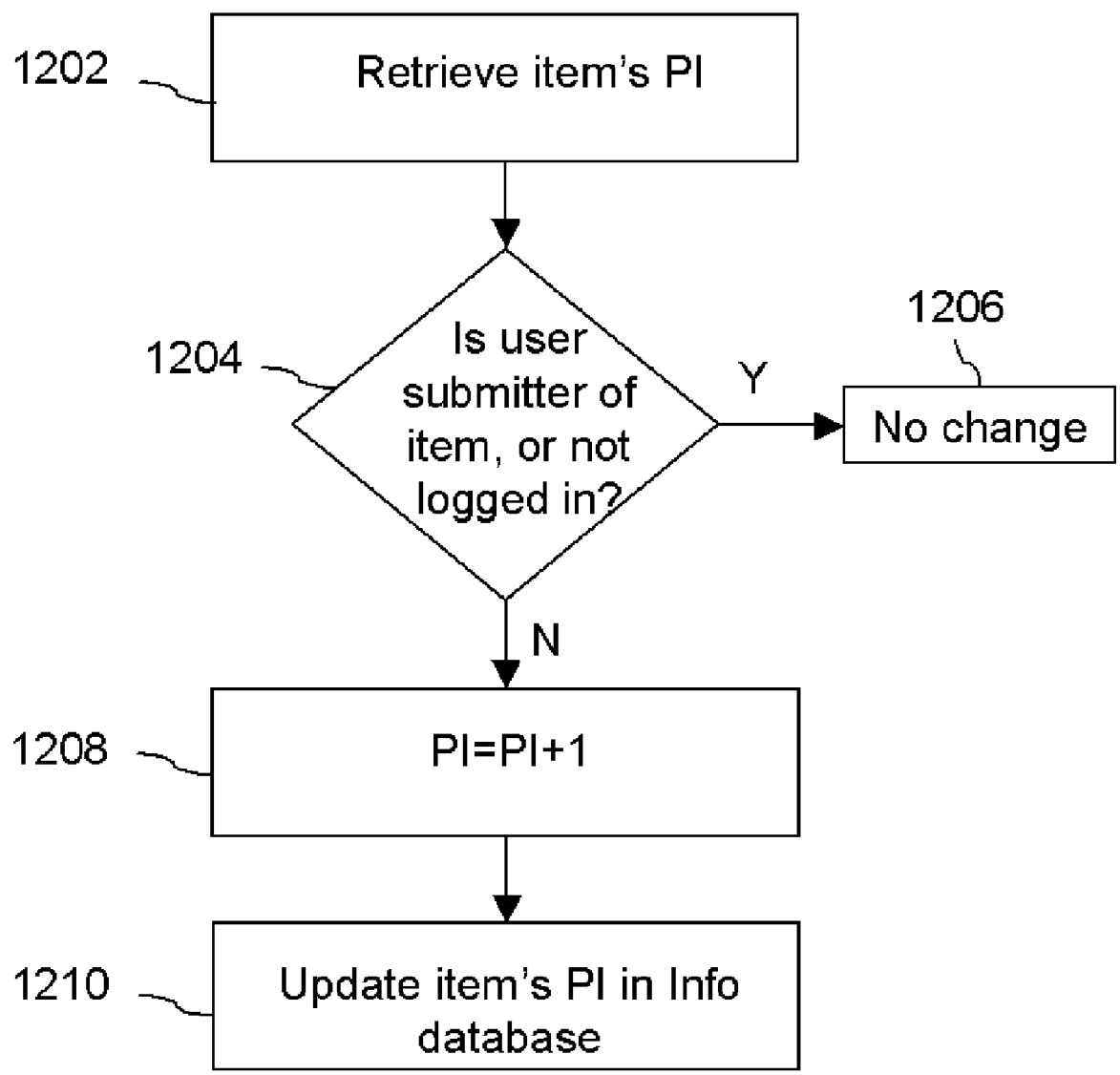
FIG. 13 is a flow chart demonstrating the way to calculate the popularity index (PI) during a drag-and-drop operation in accordance with an embodiment of the invention.

FIG. 13 is a flow chart demonstrating the way to calculate the popularity index (PI) during a drag-and-drop operation in accordance with an embodiment of the invention. At step 1202, web server 308 retrieves the item's PI. At step 1204, web server 308 checks if the user is the owner of the item. In case the user is the owner of the item or a user that has not logged in, at step 1206, the PI is left unchanged. Otherwise, at step 1208, the PI of the item is incremented by one. At step 1210, the item's PI is updated in the info database.

An embodiment of the present invention or any of its components may be embodied in the form of a processing machine. Typical examples of a processing machine include a computer, a programmed microprocessor, an integrated circuit, and other devices or arrangements of devices that are capable of implementing the steps of the method of the current invention.

The processing machine executes a set of instructions that are stored in one or more storage elements, in order to process input data. The storage elements may also hold data or other information as desired. The storage element may be in the form of an information destination or a physical memory element present in the processing machine.

The set of instructions may include various commands that instruct the processing machine to perform specific tasks such as the steps that constitute the method of the present invention. The set of instructions may be in the form of a software program. The software may be in various forms such as system software or application software. Further, the software might be in the form of a collection of separate programs, a program module with a larger program or a portion of a program module. The software might also include modular programming in the form of object-oriented programming. The processing of input data by the processing machine may be in response to user commands, or in response to results of previous processing or in response to a request made by another processing machine.

A person skilled in the art can appreciate that the various processing machines and/or storage elements may not be physically located in the same geographical location. The processing machines and/or storage elements may be located in geographically distinct locations and connected to each other to enable communication. Various communication technologies may be used to enable communication between the processing machines and/or storage elements. Such technologies include session of the processing machines and/or storage elements, in the form of a network. The network can be an intranet, an extranet, the Internet or any client server models that enable communication. Such communication technologies may use various protocols such as TCP/IP, UDP, ATM or OSI.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A computer implemented method for dynamically reordering and subsequently displaying an online list of a plurality of advertisements, each advertisement added by an owner for display to other individuals viewing the online list, the method comprising the steps of:
    creating an online list comprising a plurality of advertisements at predefined positions, wherein each advertisement is added to the online list by an owner;
    selecting an advertisement from the online list, wherein the selecting is performed by a user and wherein the user is someone other than the owner that added the selected advertisement;
    designating a new position in the online list for the selected advertisement, wherein the designating is performed by the user;
    reordering the positions of the plurality of advertisements in the online list based on the new position for the selected advertisement;
    billing the user for the reordering displaying the reordered online list; and,
    wherein the above steps are performed using a computer.

2. The computer implemented method as recited in claim 1, wherein the step of selecting is performed by a drag and drop action by the user.

3. The computer implemented method as recited in claim 1 further comprising the steps of:
    (a) capturing the reordered position of advertisements;
    (b) displaying the captured position of advertisements to the user; and
    (c) repeating steps (a)-(b) after a predefined interval of time.

4. The method as recited in claim 1, wherein the user views the online list in a web browser.

5. The method as recited in claim 1, wherein the step of billing is implemented if the new position for the selected advertisement is above a predefined position.

6. A computer readable medium storing instructions for dynamically reordering and subsequently displaying an online list of a plurality of advertisements, each advertisement added by an owner for display to other individuals viewing the online list, the instructions when executed cause the computer to perform the following steps:
    creating an online list comprising a plurality of advertisements at predefined positions, wherein each advertisement is added to the online list by an owner;
    selecting an advertisement from the online list, wherein the selecting is performed by a user and wherein the user is someone other than the owner that added the selected advertisement;
    designating a new position in the online list for the selected advertisement, wherein the designating is performed by the user;
    reordering the positions of the plurality of advertisements in the online list based on the new position for the selected advertisement;
    billing the user for the reordering; and,
    displaying the reordered online list.

7. The computer readable medium as recited in claim 6, wherein the step of selecting is performed by a drag and drop action by the user.

8. The computer readable medium as recited in claim 6 further performing the steps of:
    (a) capturing the reordered position of advertisements;
    (b) displaying the captured position of advertisements to the user; and
    (c) repeating steps (a)-(b) after a predefined interval of time.

9. The computer readable medium as recited in claim 6, wherein the user views the online list in a web browser.

* * * * *